No. 717,072. Patented Dec. 30, 1902.
J. BURRY.
MAGNETO-THERAPEUTIC APPARATUS.
(Application filed May 8, 1901.)
(No Model.)
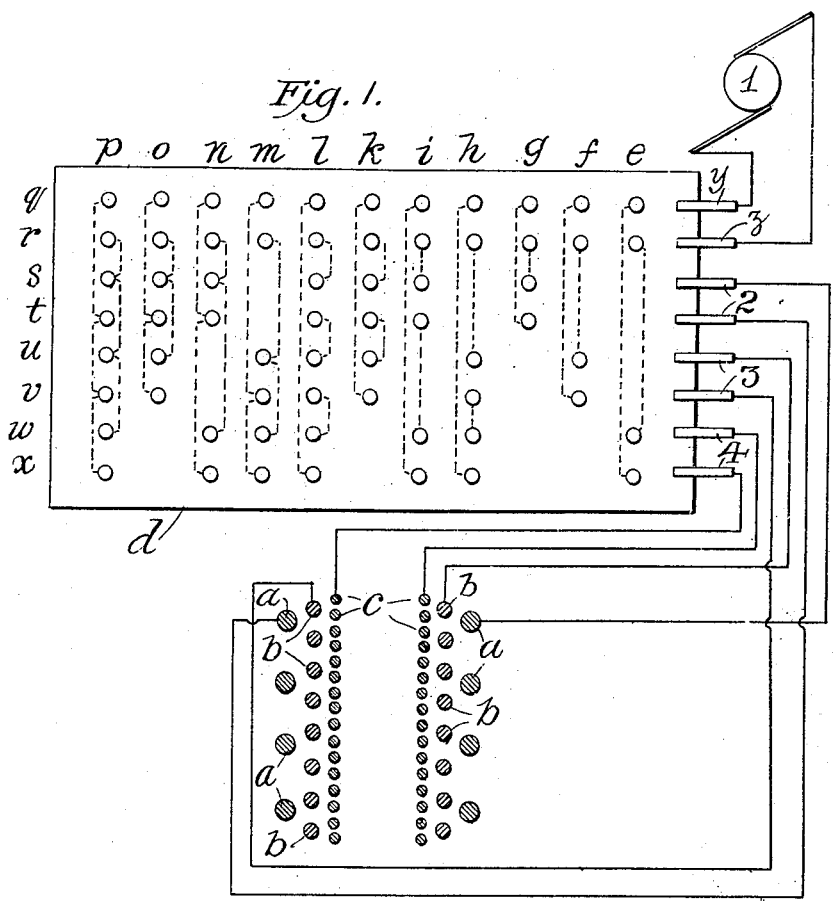
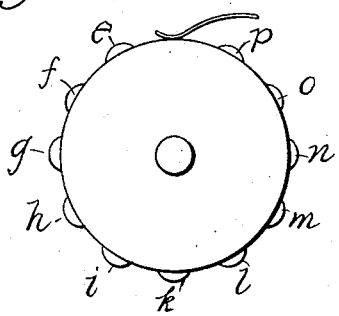
WITNESSES:
James F. Duhamel.
Edwin N. Frost
INVENTOR:
John Burry,
BY
Richard W. Barkley,
his ATTORNEY.

UNITED STATES PATENT OFFICE.

JOHN BURRY, OF BROOKLYN, NEW YORK.

MAGNETOTHERAPEUTIC APPARATUS.

SPECIFICATION forming part of Letters Patent No. 717,072, dated December 30, 1902.

Application filed May 8, 1901. Serial No. 59,330. (No model.)

*To all whom it may concern:*

Be it known that I, JOHN BURRY, a citizen of the United States, and a resident of Brooklyn, in the county of Kings and State of New York, have invented a certain new and useful Improvement in Magnetotherapeutic Apparatus, of which the following is a specification.

The present invention relates to an improvement upon the apparatus shown in my prior application for Letters Patent of the United States, filed May 8, 1900, Serial No. 15,870, and has for its main object the provision of means whereby the intensity of the alternating magnetic field may be varied.

The preferred form of the invention is illustrated in the accompanying drawings, forming part of this specification, in which—

Figure 1 is a diagrammatic view showing a triple solenoid, the development of a commutator, and electric connections. Fig. 2 is an end view of a cylindrical commutator, such as that shown developed in Fig. 1.

References $a\ b\ c$ indicate three concentric solenoids whose coils are not connected with each other and which coils are insulated from each other. (Insulation not shown.)

$d$ indicates the development of the surface of a cylindrical commutator.

$e\ f\ g\ h\ i\ k\ l\ m\ n\ o\ p$ indicate longitudinal lines or rows of contact-points, and $q\ r\ s\ t\ u\ v\ w\ x$ indicate circumferential rows of contact-points of the commutator. The dotted lines in Fig. 1 indicate the electrical connections between the points of the longitudinal rows.

$y\ z$ indicate brushes for coaction with the contacts of rows $q\ r$, and 1 is a dynamo, preferably one furnishing an alternating current, as this avoids apparatus for converting a straight or direct current to an alternating one the poles of which are connected with brushes $y\ z$, as shown.

2 3 4 are pairs of brushes or terminals coacting, respectively, with the circumferential rows, or rather pairs of rows, $s\ t$, $u\ v$, $w\ x$ and electrically-connected pair 2 with the solenoid $a$, pair 3 with solenoid $b$, and pair 4 with solenoid $c$.

The diagram Fig. 1 shows that when rows $e\ f\ g$ are severally under the brushes $y\ z$ 2 3 4 the solenoids are connected individually with the dynamo 1; that when row $h$ is under said brushes solenoids $b\ c$ are connected in series; that when row $i$ is under said brushes solenoids $a\ c$ are connected in series; that when row $k$ is under said brushes solenoids $a\ b$ are connected in series; that when row $l$ is under said brushes solenoids $a\ b\ c$ are connected in series; that when row $m$, $n$, $o$, or $p$ is under said brushes solenoids $b\ c$ or $a\ c$ or $a\ b$ or $a\ b\ c$ are connected in parallel. In this way different strengths or intensities of the magnetic field within the solenoids may be secured even when the current remains unchanged at the poles of the dynamo.

I have employed alternating currents ranging from about eighteen to one hundred and twenty cycles per second at a voltage of from one hundred to one hundred and twenty and an amperage of from one to twenty amperes.

While I show three solenoids in the drawings, it will be understood that I do not limit myself to any particular number of solenoids. It will be understood also that while I use the term "solenoid" herein it is not used altogether in the sense given in Webster's or the Century dictionaries, but also in the sense of a coil or spiral or wire or other conductor.

In the use of the apparatus the part to be treated is placed within the solenoids and an alternating current is sent through one or more of the coils, according to the position of the commutator relative to the brushes or terminals.

What I claim as new, and desire to secure by Letters Patent of the United States, is—

1. The combination of a plurality of solenoids surrounding a common space and electrically independent of each other, terminals for each of said solenoids, and a movable carrier provided with several series of contacts connected and arranged to coact with said terminals to connect said solenoids individually and in various combinations with a source of electric energy, substantially as described.

2. In a therapeutic apparatus, the combination with a plurality of solenoids surrounding a common space in which the part to be treated is placed, of means for connecting a source of electric energy with the solenoids severally or in combination in series, substantially as described.

3. In a therapeutic apparatus, the combination with a plurality of solenoids surrounding a common space in which the part to be treated is placed, of means for connecting a source of electric energy with the solenoids severally or in combination in parallel, substantially as described.

4. In a therapeutic apparatus, the combination with a plurality of solenoids surrounding a common space in which the part to be treated is placed, of means for connecting a source of electric energy with the solenoids in combination in series or in parallel, substantially as described.

5. In a therapeutic apparatus, the combination with a plurality of solenoids surrounding a common space in which the part to be treated is placed, of means for connecting a source of electric energy with the solenoids severally or in combination in series or in parallel, substantially as described.

Signed at New York, in the county of New York and State of New York, this 14th day of November, A. D. 1900.

JOHN BURRY.

Witnesses:
R. W. BARKLEY,
R. C. ALEXANDER.